United States Patent
Batni et al.

(10) Patent No.: US 8,068,593 B2
(45) Date of Patent: *Nov. 29, 2011

(54) METHOD AND APPARATUS FOR PROVIDING MULTIMEDIA RINGBACK SERVICES TO MOBILE USER DEVICES IN PRE-IMS NETWORKS

(75) Inventors: Ramachendra Batni, Phoenix, AZ (US); Katherine Guo, Eatontown, NJ (US); Sarit Mukherjee, Morganville, NJ (US); Tejas Naik, Edison, NJ (US); Ranjan Sharma, New Albany, OH (US)

(73) Assignee: Alcatel Lucent, Paris (FR)

( * ) Notice: Subject to any disclaimer, the term of this patent is extended or adjusted under 35 U.S.C. 154(b) by 736 days.

This patent is subject to a terminal disclaimer.

(21) Appl. No.: 11/026,509

(22) Filed: Dec. 30, 2004

(65) Prior Publication Data

US 2006/0147010 A1    Jul. 6, 2006

(51) Int. Cl.
*H04M 3/42*    (2006.01)
(52) U.S. Cl. ......... 379/207.16; 379/373.01; 379/373.02; 379/373.04; 370/352
(58) Field of Classification Search ............. 379/202.01, 379/207.16, 257, 373.01, 373.02, 373.04; 370/352
See application file for complete search history.

(56) References Cited

U.S. PATENT DOCUMENTS

| | | | |
|---|---|---|---|
| 6,377,568 B1 | 4/2002 | Kelly | |
| 6,400,804 B1 * | 6/2002 | Bilder | 379/76 |
| 7,142,656 B2 | 11/2006 | Moody et al. | |
| 2004/0114732 A1 | 6/2004 | Choe et al. | |
| 2004/0120494 A1 * | 6/2004 | Jiang et al. | 379/210.01 |
| 2005/0185771 A1 * | 8/2005 | Benno et al. | 379/88.17 |
| 2006/0023862 A1 * | 2/2006 | Sutcliffe | 379/257 |
| 2006/0147010 A1 | 7/2006 | Batni et al. | |
| 2006/0206604 A1 | 9/2006 | O'Neil et al. | |
| 2007/0121595 A1 | 5/2007 | Batni et al. | |
| 2007/0161412 A1 | 7/2007 | Nevid et al. | |
| 2007/0189474 A1 | 8/2007 | Cai | |
| 2007/0281750 A1 | 12/2007 | Cox et al. | |

FOREIGN PATENT DOCUMENTS

| | | |
|---|---|---|
| EP | 05 25 7737 | 3/2006 |
| JP | 1997-162978 | 6/1997 |
| JP | 2002-237905 | 8/2002 |
| JP | 2003-505937 | 2/2003 |

(Continued)

OTHER PUBLICATIONS

Search Report in EP 05 25 7735 associated with U.S. Appl. No. 11/027,298, Date Mar. 31, 2006, Lucent Technologies Inc.

(Continued)

*Primary Examiner* — Ahmad F Matar
*Assistant Examiner* — Antim Shah
(74) *Attorney, Agent, or Firm* — Wall & Tong, LLP

(57) ABSTRACT

The invention comprises a method and apparatus for providing multimedia content to a calling party device. Specifically, the method comprises receiving a multimedia ringback service request in response to a connection request for establishing a connection between the calling party device and a called party device, determining an address associated with the calling party device in response to the multimedia ringback service request, identifying the multimedia content associated with the multimedia ringback service request, and establishing at least one multimedia session with the calling party device using the address where the at least one multimedia session is operable for providing the multimedia content towards the calling party device contemporaneously with establishing the connection.

21 Claims, 4 Drawing Sheets

FOREIGN PATENT DOCUMENTS

| | | |
|---|---|---|
| JP | 2004-088452 | 3/2004 |
| WO | WO 2004/054282 A | 6/2004 |
| WO | WO 2004/084566 A | 9/2004 |
| WO | WO 2004/084566 A1 | 9/2004 |
| WO | WO2004/093422 A1 | 10/2004 |

OTHER PUBLICATIONS

Sip Wg G. Camarillo Ericsson H. Schulzrinne Columbia University: "Early Media and Ringback Tone Generation in the Session Initiation Protocol" IEFT Standard-Working-Draft, Internet Engineering Task Force, IETF, CH, No. 1, Feb. 10, 2003, pp. 1-10, XP015000437 ISSN: 0000-0004.

"Digital cellular telecommunications system (Phase 2+); Universal Mobile Telecommunications System (UMTS); IP Multimedia (IM) session handling; IM call model; Stage 2 (3GPP TS 23.218 version 6.2.0 Release 6); ETSI TS 123 218" ETSI Standards, European Telecommunications Standards Institute, Sophia-Antipo, FR, vol. 3-CN1, No. V620, Sep. 2004, XP014027526 ISSN: 0000-0001.

Translation Examiner's Official Letter mailed Jan. 21, 2001 in Japanese Patent Application No. 2005-0374375, Alcatel-Lucent USA Inc., Applicant; 2 pages.

* cited by examiner

100

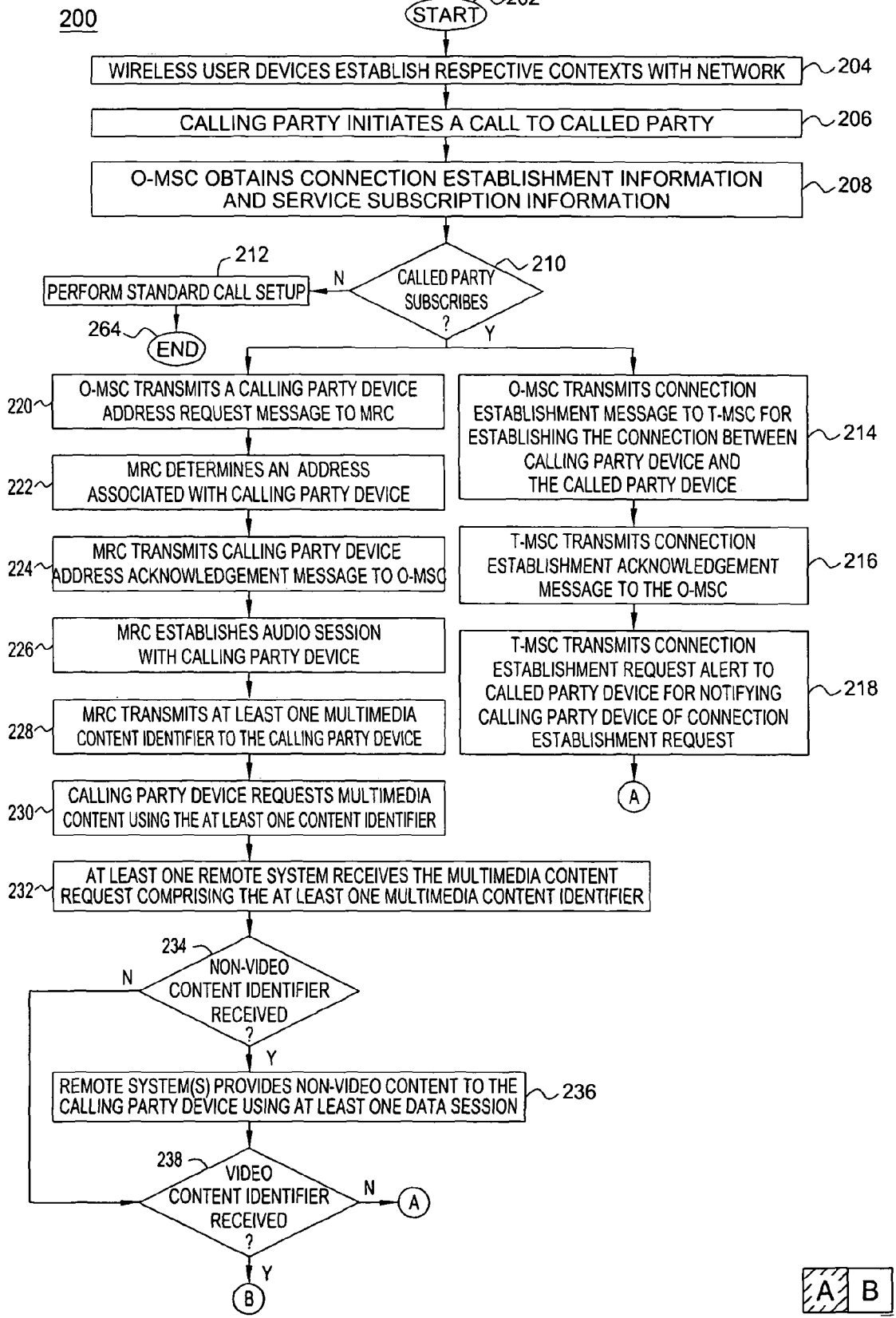

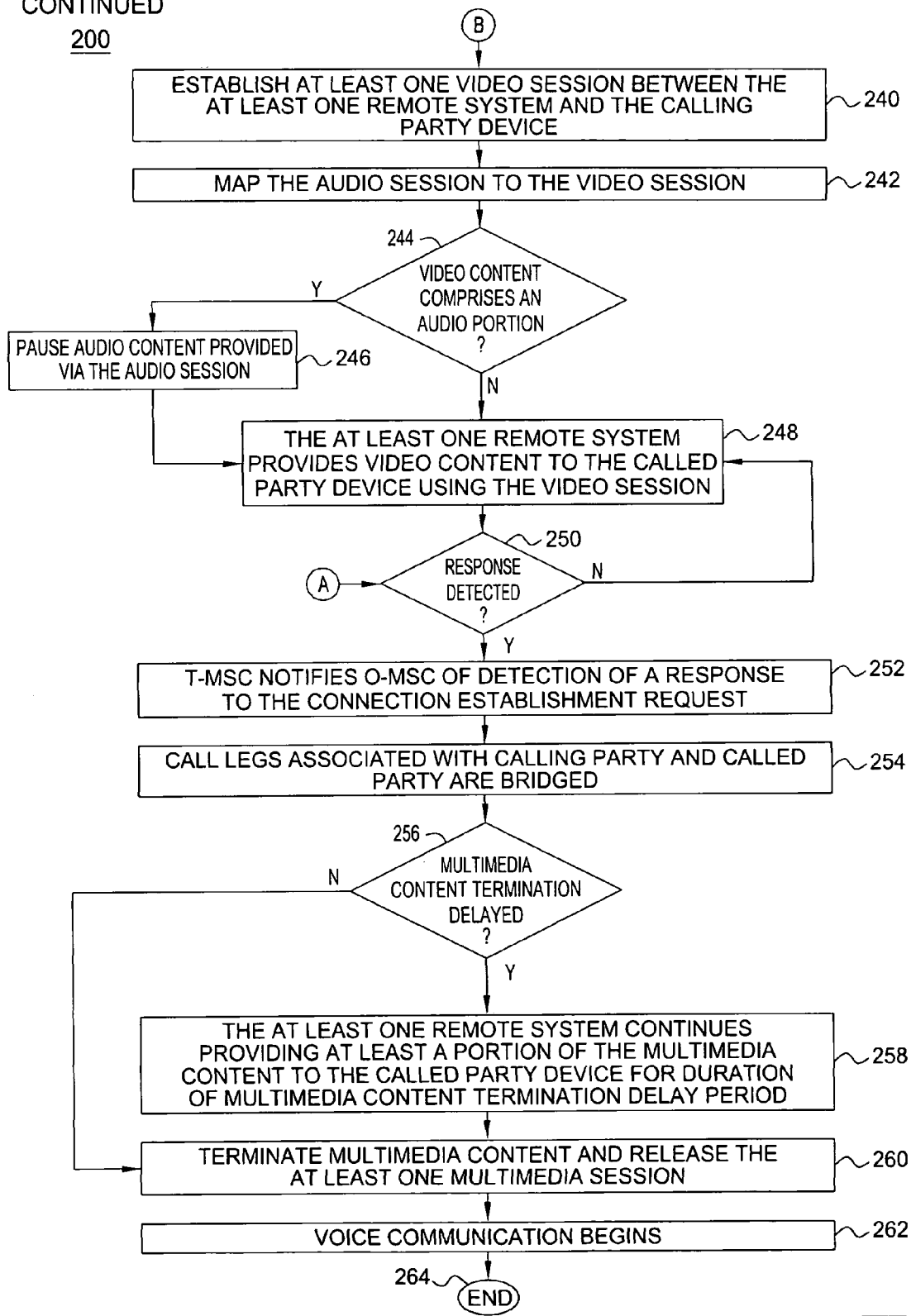

METHOD AND APPARATUS FOR PROVIDING MULTIMEDIA RINGBACK SERVICES TO MOBILE USER DEVICES IN PRE-IMS NETWORKS

FIELD OF THE INVENTION

The invention relates to the field of communication networks and, more specifically, to providing ringback services to wireless user devices.

BACKGROUND OF THE INVENTION

In general, existing ringback services enable wireless service subscribers to pre-select audio content to be played to communication devices by which calls are initiated to the wireless service subscribers. The audio ringback service replaces a traditional ringing sound heard by a calling party before the called party answers with enhanced audio content pre-selected by the called party. As such, the audio ringback service enables the called party to customize audio content that a calling party hears during connection establishment between the calling party device and the called party device. For example, audio content played to a calling party includes specialized ring tones, announcements, music, and similar enhanced audio content. Unfortunately, existing ringback services are currently limited to providing purely audio content

SUMMARY OF THE INVENTION

Various deficiencies in the prior art are addressed through the invention of a method and apparatus for providing multimedia content to a calling party device. Specifically, a method according to one embodiment of the invention comprises receiving a multimedia ringback service request in response to a connection request for establishing a connection between the calling party device and a called party device, determining an address associated with the calling party device in response to the multimedia ringback service request, identifying the multimedia content associated with the multimedia ringback service request, and establishing at least one multimedia session with the calling party device using the address where the at least one multimedia session is operable for providing the multimedia content towards the calling party device contemporaneously with establishing the connection and wherein the at least one multimedia session comprises at least one data session and at least one video session, the at least one data session operable for providing non-video content towards the calling party device contemporaneously with establishment of the at least one video session.

BRIEF DESCRIPTION OF THE DRAWINGS

The teachings of the present invention can be readily understood by considering the following detailed description in conjunction with the accompanying drawings, in which:

FIG. 2 depicts a flow diagram of a method according to one embodiment of the invention.

To facilitate understanding, identical reference numerals have been used, where possible, to designate identical elements that are common to the figures.

DETAILED DESCRIPTION OF THE INVENTION

The invention is discussed in the context of a communications architecture comprising a plurality of wireless access networks, an IP network, and a circuit-switched network; however, the methodology of the invention can readily be applied to other networks architectures. In general, the present invention enables wireless service providers to provide multimedia ringback content to a calling party device during connection establishment between the calling party device and the called party device. As such, the present invention enables the calling party to experience various combinations of multimedia content (e.g., audio, text, still-image, animated-image, video, and the like) configured by the called party for presentation to the calling party during call establishment.

Figure 1:
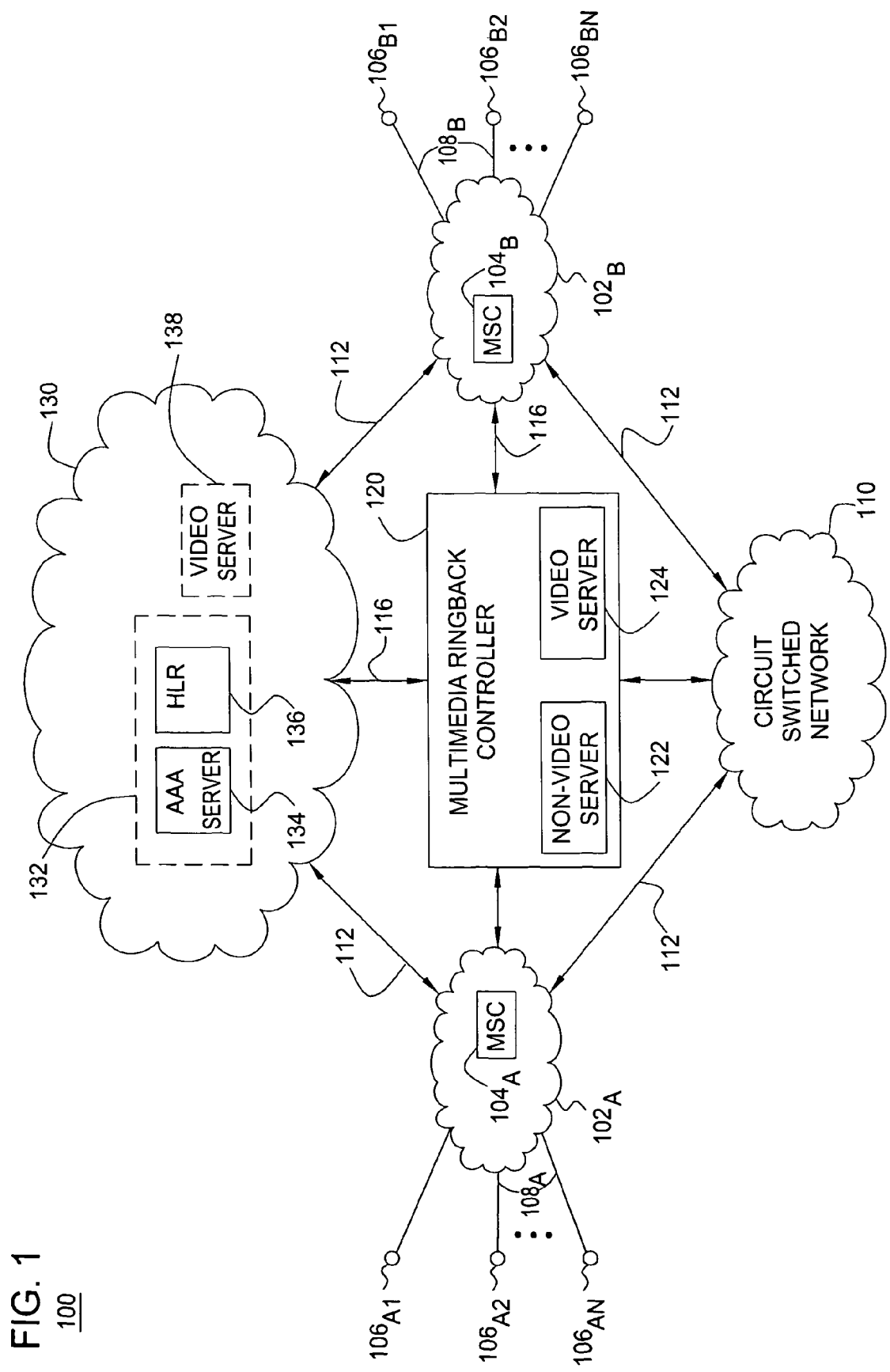
FIG. 1 depicts a high-level block diagram of a communications network architecture.

FIG. 1 depicts a high-level block diagram of a communications network architecture. Specifically, communications network architecture 100 of FIG. 1 comprises a plurality of access networks (ANs) $102_A$-$102_B$ (collectively, ANs 102), a circuit-switched network (CSN) 110, an Internet Protocol network (IPN) 130, and a multimedia ringback controller (MRC) 120. As depicted in FIG. 1, ANs 102 communicate with CSN 110 and IPN 130 via respective pluralities of communication links (CLs) 112 (collectively, CLs 112). Although depicted as directly connected via CLs 112, those skilled in the art will appreciate that communication between the ANs 102 and CSN 110 and IPN 130 is facilitated using additional network elements and communication links (not depicted). As depicted in FIG. 1, MRC 120 communicates with the ANs 102, CSN 110, and IPN 130 via a plurality of communication links (CLs) 116 (collectively, CLs 116).

As depicted in FIG. 1, AN $102_A$ comprises a mobile switching center (MSC) $104_A$. An associated plurality of wireless user devices (WUDs) $106_{A1}$-$106_{AN}$ (collectively, WUDs $106_A$) access AN $102_A$ via a respective plurality of wireless access links (WALs) $108_A$ (collectively, WALs $108_A$). Similarly, AN $102_B$ comprises a mobile switching center (MSC) $104_B$. An associated plurality of wireless user devices (WUDs) $106_{B1}$-$106_{BN}$ (collectively, WUDs $106_B$) access AN $102_B$ via a respective plurality of wireless access links (WALs) $108_B$ (collectively, WALs $108_B$). The MSC $104_A$ and MSC $104_B$ are collectively denoted as MSCs 104. The WUDs $106_A$ and WUDs $106_B$ are collectively denoted as WUDs 106.

As depicted in FIG. 1, the ANs 102 comprise at least one of a plurality of various wireless networks operable for providing wireless services to the WUDs 106. In one embodiment, the ANs 102 comprises at least one of a General Packet Radio Service (GPRS) wireless AN, a Global System for Mobile (GSM) wireless AN, a Third Generation (3G) wireless AN (e.g., a Wideband Code Division Multiple Access (WCDMA) AN, a Universal Mobile Telecommunications System (UMTS) AN, a CDMA2000 AN, and the like), a Fourth Generation (4G) wireless AN, a WIFI wireless AN, and like wireless ANs as known in the art.

As described herein, the WUDs 106 comprise wireless user devices operable for initiating and receiving calls, as well as accessing various network services, via the associated WALs 108. As such, although described herein with respect to mobile phones, the WUDs 106 comprise mobile phones, personal digital assistants (PDAs), computers, and like wireless devices as known in the art. It should be noted that a user initiating a call is denoted as a calling party and a user to which a call is initiated is denoted as a called party. As such, a WUD from which a call is initiated is denoted as a calling user device and a WUD to which a call is initiated is denoted as a called user device.

As described herein, ANs 102 comprise respective MSCs 104. Although depicted as comprising the MSCs 104, those skilled in the art will appreciate that the ANs 102 comprise additional network elements. As such, in one embodiment, the ANs 102 comprise various combinations of base station controllers (BSCs), visitor location registers (VLRs), home location registers (HLRs), radio network controllers (RNCs), serving GPRS support nodes (SGSNs), gateway GPRS support nodes (GGSNs), gateway MSCs (GMSCs), and like network elements as known in the art. In one embodiment, at least a portion of the additional network elements deployed depends on the wireless AN type. For example, at least a portion of the network elements deployed in a GPRS network may differ from at least a portion of the network elements deployed in a UMTS network.

In one embodiment, the MSCs 104 operate as MSCs for switching calls within each of the respective ANs 104. In general, operating in this capacity, MSCs perform switching functions, signaling functions (e.g., common channel signaling), and like functionality. In one embodiment, the MSCs 104 comprise standard MSC functionality, as well as GMSC functionality, operating as respective points-of-access to CSN 110. In another embodiment, the MSCs 104 comprise standard MSC functionality, as well as GGSN functionality, operating as respective points-of-access to IPN 130. Although not depicted, in another embodiment, the GMSC functionality, GGSN functionality, and like functionality may be implemented as respective portions of discrete network elements operating as gateway elements for facilitating communication between the MSCs 104, and CSN 1 10 and IPN 130, respectively.

In one embodiment, the MSCs 104 operate as both originating-MSCs and terminating-MSCs, depending upon the source and destination of a connection establishment request. For example, for a connection establishment request initiated from WUD 106$_{A1}$ (calling user device) to the WUD 106$_{B1}$ (called user device), MSC 104$_A$ functions as an originating-MSC (O-MSC) and MSC 104$_B$ functions as a terminating-MSC (T-MSC). Similarly, for example, for a connection establishment request initiated from WUD 106$_{B2}$ (calling user device) to WUD 106$_{A1}$ (called user device), the MSC 104$_B$ functions as an O-MSC and MSC 104$_A$ functions as a T-MSC.

Although depicted and described herein as O-MSCs and T-MSCs, MSCs depicted and described herein comprise MSCs operable for supporting American National Standards Institute (ANSI) networks, European Telecommunications Standards Institute (ETSI) networks, International Telecommunications Union-Telecommunication (ITU-T) networks, and like networks as known in the art. As such, each of the O-MSCs and T-MSCs as described herein may comprise at least one of a serving-MSC (S-MSC), a visited-MSC (V-MSC), an originating (O-MSC), a gateway-MSC (G-MSC), and the like depending on the network type, whether the wireless user device is roaming, and like factors.

For example, if a WUD associated with MSC 104B is roaming (i.e., outside the home area associated with the WUD), in an ANSI network the T-MSC 104$_B$ functions as a S-MSC; however, in an ITU-T network the T-MSC 104$_B$ functions as a V-MSC. Similarly, if a WUD associated with MSC 104$_A$ is not roaming (i.e., located within the home area associated with the WUD), in an ANSI network the O-MSC 104$_A$ functions as a O-MSC; however, in an ITU-T network the O-MSC 104$_A$ functions as a G-MSC. Furthermore, although depicted and described with respect to an O-MSC (associated with the calling party device) and a T-MSC (associated with the called party device), in one embodiment, the calling party device and called party device access the network through a common MSC.

As depicted in FIG. 1, CSN 110 comprises a circuit-switched network. Although not depicted, those skilled in the art will appreciate that CSN 110 comprises a plurality of network elements and associated communication links operable for supporting circuit-switched connections and associated signaling. As such, CSN 110 comprises at least one of a Publicly Switched Telephone Network (PSTN), an Integrated Service Digital Network (ISDN), Signaling System Seven (SS7) network, and like circuit-switched networks as known in the art. In one embodiment, the CSN 110 interfaces with a GMSC for accessing the ANs 102.

As depicted in FIG. 1, the IPN 130 comprises a plurality of servers 132 (collectively, servers 132) comprising an Authentication, Authorization, and Accounting (AAA) server 134 and a home location register (HLR) 136. In general, AAA server 134 comprises a system for controlling access to network resources, for tracking user network activities, and for performing like functions. In general, HLR 136 comprises a system for maintaining permanent subscriber information (e.g., address information, account information, user preferences, and like information) associated with wireless service subscribers. In one embodiment, the subscriber information comprises at least one of: connection establishment information and subscriber service information.

In one embodiment, IPN 130 optionally comprises a video server (VS) 138. Although not depicted, those skilled in the art will appreciate that IPN 130 comprises various other network elements and service elements, such as border elements (BEs), core elements (CEs), call admission controllers (CAC), call control elements (CCEs), network routing engines (NREs), user profile engines (UPEs), domain name servers (DNSs), service broker (SB) systems, media servers (MSs), and like network elements and service elements for supporting IP network traffic and associated services.

As depicted in FIG. 1, the MRC 120 comprises a system for controlling multimedia ringback services provided to a calling party device during connection establishment between the calling party device and the called party device. As depicted in FIG. 1, MRC 120 comprises a non-video server (NVS) 122 and video server (VS) 124. In one embodiment, NVS 122 stores non-video content such as text content, still-image content, animated-image content, and like non-video content. In one embodiment, VS 124 hosts video content (e.g., video clips). In another embodiment, VS 124 stores non-video content and video content. For example, in one embodiment, VS 124 stores animated-image content and video content. In another embodiment, VS 124 stores all multimedia content, thereby obviating the need for NVS 122.

In one embodiment, for example, controlling multimedia ringback service comprises identifying an address associated with a calling party device in response to a determination that the called party subscribes to a multimedia ringback service. In another embodiment, for example, controlling multimedia ringback service comprises establishing at least one multimedia session between at least one multimedia content server (e.g., NVS 122, VS, 124, VS 138, and like content servers) and the calling party device for providing multimedia content to the calling party device during connection establishment. As such, MRC 120 performs at least a portion of the methodologies of the present invention as described herein.

Although depicted as comprising various numbers of ANs 102, MSCs 104, WUDs 106, WALs 108, CSNs 110, MRCs 120, NVSs 122, VSs 124, IPNs 130, AAA servers 134, HLRs 136, VSs 138, CLs 112, and CLs 116, those skilled in the art will appreciate that fewer or more ANs 102, MSCs 104, WUDs 106, WALs 108, CSNs 110, MRCs 120, NVSs 122, VSs 124, IPNs 130, AAA servers 134, HLRs 136, VSs 138, CLs 112, and CLs 116 may be used. Similarly, the ANs 102, MSCs 104, WUDs 106, WALs 108, CSNs 110, MRCs 120, NVSs 122, VSs 124, IPNs 130, AAA servers 134, HLRs 136, VSs 138, CLs 112, and CLs 116 may be deployed in various different configurations. Furthermore, although depicted as communicating with CSN 110 and IPN 130, in one embodiment, the ANs 102 interface with various other networks such as personal digital cellular (PDC) networks, packet data switched networks (PDSNs), and like networks.

FIG. 2 depicts a flow diagram of a method according to one embodiment of the invention. Specifically, method 200 of FIG. 2 comprises a method for providing multimedia content to a calling party device contemporaneous with establishment of a connection between the calling party device and a called party device. Although a portion of the steps of method 200 are depicted as being performed serially, those skilled in the art will appreciate that at least a portion of the steps may be performed contemporaneously. The method 200 is entered at step 202 and proceeds to step 204.

At step 204, wireless user devices establish respective contexts with a packet-switching network. As such, prior to a connection establishment request, a calling party device and a called party device establish contexts with a packet-switching network. In one embodiment, in which a WUD establishes a connection with a GPRS AN, the WUD establishes a Packet Data Protocol (PDP) context with the packet-switching network. In another embodiment, in which a WUD establishes a connection with a non-GPRS AN, the WUD establishes a context with a packet-switching network that is substantially similar to the PDP context described with respect to GRPS networks.

In general, a context comprises a logical association between the WUD and packet-switching network running across a wireless AN. In one embodiment, a PDP context comprises a logical association between the WUD and a packet-switching network running across a GPRS AN. In one such embodiment, the WUD establishes the PDP context with a GGSN. In one embodiment, a PDP context comprises at least one parameter associated with the WUD, such as routing parameters, quality of service parameters, security parameters, billing parameters, and like context parameters.

At step 206, a calling party initiates a call to a called party. In other words, a calling party attempts to establish a connection (i.e., a voice communication channel) with a called party. For example, assume that a calling party associated with WUD $106_{A2}$ (calling party device) initiates a call to a called party associated with WUD $106_{B1}$ (called party device). As described herein, prior to initiation of the call from calling party device WUD $106_{A2}$ to called party device WUD $106_{B1}$, WUD $106_{A2}$ and WUD $106_{B1}$ establish PDP contexts with GGSNs (not depicted) associated with AN $102_A$ and AN $102_B$, respectively.

At step 208, the O-MSC (associated with the calling party device) obtains information in response to receiving a connection establishment request initiated by the calling party. In one embodiment, at least a portion of the information is obtained from at least one remote system, such as a MRC, a HLR, a VLR, and like systems. For example, in one embodiment, the O-MSC queries a HLR for obtaining called party connection establishment information and called party service subscription information, and the requested information is downloaded to the O-MSC by the HLR using query response parameters.

In one embodiment, the information comprises connection establishment information and service subscription information. In one embodiment, connection establishment information comprises at least one of: calling party information, calling party device information, called party information, called party device information, routing information, and the like. For example, party information comprises account information, service subscription information, and the like. For example, device information comprises supported device functions, network access information, and the like. For example, in one embodiment, connection establishment information comprises calling party device routing information, called party device routing information for locating the called party device, and like information.

In one embodiment, the service subscription information comprises at least one of: calling party subscription information and called party subscription information. For example, in one embodiment, the called party subscription information comprises at least one multimedia ringback service subscription parameter for determining whether the called party subscribes to a multimedia ringback service (i.e., a service for providing multimedia content to at least one calling party device during connection establishment).

In one embodiment, called party subscription information comprises at least one multimedia content identifier (e.g., an identifier associated with various audio, text, image, and video content). In one further embodiment, called party subscription information comprises at least one multimedia content identifier associated with each calling party. In one embodiment, the association of the multimedia content to a calling party is configurable by the called party. In one further embodiment, multimedia content provided to calling party devices is configurable based on call date, call time, and like parameters.

In one embodiment, called party subscription information comprises at least one multimedia content identifier operable for providing specific multimedia content to calling party devices during connection establishment irrespective of the calling party. For example, a particular video clip is provided to all calling party devices irrespective of the calling party. In another embodiment, called party subscription information comprises at least one multimedia content identifier operable for providing specific multimedia content to a specific calling party during connection establishment. For example, a called party configures a multimedia ringback service such that a video clip is provided to one calling party while a text message is provided to another calling party.

In continuation of the above example, the MSC $104_A$ (i.e., the O-MSC) queries HLR 136 for retrieving information in response to the initiation of the connection establishment by the calling party via calling party device WUD $106_{A2}$. In this example, the retrieved information comprises connection establishment information for locating called party device WUD $106_{B1}$, service subscription information for determining whether the called party subscribes to the multimedia ringback service, and like information.

At step 210, a determination is made as to whether the called party subscribes to multimedia ringback service. In one embodiment, the determination is performed using at least a portion of the information retrieved by the O-MSC (e.g., service subscription information) in response to the connection establishment request. In another embodiment, the determination is performed by querying at least one database associated with at least one remote system. In this embodiment, the at least one remote system comprises at least one of: at least one MRC, at least one AAA server, at least one HLR, at least one VLR, at least one billing database, at least one service subscription database, and like remote systems and associated databases.

If the called party device does not subscribe to a multimedia ringback service, method 200 proceeds to step 212, at which point standard connection establishment is performed. In one exemplary embodiment, standard connection establishment is performed using at least a portion of steps 214, 216, 218, 250, 252, 254, and 262, as depicted and described herein with respect to FIG. 2. The method 200 then proceeds to step 264 where method 200 ends. If the called party device does subscribe to a multimedia ringback service, the method 200 proceeds to step 214 and step 220 contemporaneously.

As depicted and described with respect to FIG. 2, step 214 and step 220 are performed contemporaneously. Similarly, at least a portion of steps 214, 216, and 218 may be performed contemporaneously with at least a portion of steps 220 through 248. In other words, establishment of at least one multimedia session for providing multimedia content to the calling party device is performed contemporaneously with establishment of a connection between the calling party device and the called party device. Similarly, providing of multimedia content to the calling party device using the at least one multimedia session is performed contemporaneously with establishment of the connection between the calling party device and the called party device.

At step 214, the O-MSC transmits a connection establishment message to a T-MSC for establishing a connection (e.g., a voice communication channel) between the calling party device and the called party device. In one embodiment, the T-MSC (i.e., the MSC associated with the called party device) is identified by the O-MSC using at least a portion of the connection establishment information obtained by the O-MSC. For example, the connection establishment message comprises at least a portion of the connection establishment information obtained by the O-MSC. In one embodiment, the connection establishment message comprises an Initial Address Message (IAM).

At step 216, the T-MSC initiates a connection establishment acknowledgment message to the O-MSC in response to the connection establishment message. In other words, the T-MSC acknowledges receipt of the connection establishment message from the O-MSC. In one embodiment, the connection establishment acknowledgement message is initiated in response to verification by the T-MSC that the called party device is accessible from the AN associated with the T-MSC. In one embodiment, the connection establishment acknowledgment message comprises an Address Complete Message (ACM).

At step 218, the T-MSC transmits a connection establishment request alert to the called party device for notifying the called party of the incoming connection establishment request. The method 200 then proceeds to step 250, at which point a determination is made as to whether a response to the connection establishment request is detected (e.g., the called party answers the phone, the connection establishment request is routed to a voicemail server, and the like). As such, as depicted in FIG. 2, at least a portion of steps 220 through 248 are performed contemporaneously with continuous monitoring for the detection of a response to the connection establishment request.

With respect to steps 214, 216, and 218, in continuation of the above example, MSC $104_A$ transmits a connection establishment message to MSC $104_B$ for establishing the connection between WUD $106_{A2}$ and the WUD $106_{B1}$. Upon receiving the connection establishment message, MSC $104_B$ verifies that the called party device is accessible from AN $102_B$, and initiates a connection establishment acknowledgement message to MSC $104_A$. The MSC $104_B$ then initiates a connection establishment request alert to the called party (e.g., signals the called party device causing the called party device to ring, vibrate, flash, and the like).

At step 220, the O-MSC transmits a calling party device address request message to the MRC. In one embodiment, the calling party device address message comprises at least a portion of the connection establishment information and subscriber service information previously obtained by the O-MSC. In one embodiment, the calling party device address request message comprises a request for determining an IP address associated with the calling party device. In one embodiment, the calling party device address request message comprises an Initial Address Message (IAM). In one embodiment, an IAM comprises a calling party device domain name. In continuation of the above example, MSC $104_A$ transmits a calling party device address request message to MRC 120 for determining an IP address associated with WUD $106_{A2}$.

At step 222, the MRC determines an address associated with the calling party device. As described herein, in one embodiment, the address comprises an IP address. As such, in continuation of the above example, MRC 120 obtains an IP address associated with WUD $106_{A2}$. In one embodiment, the address associated with the calling party device is determined by querying at least one remote system. In one embodiment, in which the calling party and called party subscribe to services provided by the same service provider, the address is determined by querying at least one AAA server (illustratively, AAA server 134) associated with that service provider.

In another embodiment, in which the calling party and called party subscribe to services provided by different service providers, the MRC queries at least one database for identifying at least one service provider capable of providing service to the calling party. In one such embodiment, the at least one database comprises at least one North American Numbering Plan (i.e., NPA-NXX) database table. In another such embodiment, in which at least one of the service providers capable of providing service to the calling party comprises a service provider not using the North American Numbering Plan format, the at least one database comprises at least one other database for determining the service providers capable of providing service to that calling party device.

In this embodiment, upon determining the service providers capable of providing service to the calling party device, the MRC then queries at least one system (e.g., at least one AAA server) associated with each of the service providers capable of providing service to the calling party device. In one embodiment, the queries are performed contemporaneously. The address associated with the calling party device is received by the MRC in response to the respective queries to each of the systems associated with service providers capable of providing service to the calling party. As such, multimedia ringback service is operable for providing multimedia content to calling party devices for calls between service providers.

For example, in a GPRS network, a GGSN typically assigns an IP address to a GPRS WUD during PDP session establishment. In one embodiment, for example, an AAA server assigns the IP address to the calling party device and transmits the assigned IP address to a GGSN as a portion of an Access Accept Message. In another embodiment, for example, a GGSN assigns an IP address to a PDP session during PDP session establishment. In one such embodiment, the GGSN sends an Accounting Start Record (ASR) to an AAA server. In one embodiment, for example, an ASR comprises a GGSN Network Access Server IP Address (NAS-IP) parameter, a GGSN NAS-Port parameter, a User Network Access Identifier (User NAI) parameter, a Framed-IP-Address parameter, and like parameters associated with PDP context establishment.

In one embodiment, the AAA server is configured to store at least a portion of the parameters associated with the ASR in at least one database (e.g., a Structured Query Language (SQL) database, a Lightweight Directory Access Protocol (LDAP) database, and like databases as known in the art) associated with the AAA server. In this embodiment, the MRC queries the at least one database associated with the AAA server using the User NAI parameter in order to retrieve the associated Framed-IP-Address parameter (i.e., for determining the IP address assigned to the calling party device).

For example, in one embodiment, in which the MRC queries a SQL database associated with an AAA server, the MRC initiates a SQL query comprising the following SQL "select" statement: "select Framed-IP-Address when User-Name=User NAI", where the User NAI parameter corresponds to the calling party. In one embodiment, the MRC constructs the User NAI parameter associated with the calling party using the domain name and service provider (SP) identifier (e.g., SP Name) parameters associated with the calling party.

In another embodiment, the MRC determines an address associated with the calling party device directly from the calling party device. In one such embodiment, the MRC requests the calling party device IP address from the calling party device using Dual Tone Multiple Frequency (DTMF) signaling. In one further embodiment, the calling party device provides the calling party device IP address to the MRC using DTMF signaling. For example, since an IP address comprises a string of integers, each integer of the IP address is communicated using a separate DTMF signal representative of that integer. The MRC receives the DTMF signals, and processes the received DTMF signals for constructing the IP address associated with the calling party device.

At step 224, the MRC transmits a calling party device address acknowledgement message to the O-MSC in response to the calling party device address request message. The calling party device address acknowledgement message comprises the calling party device address determined by the MRC. In one embodiment, the calling party device address acknowledgement message comprises an Address Complete Message (ACM). In continuation of the above example, the MRC 120 transmits a calling party device address request acknowledgement message (comprising the IP address associated with WUD 106$_{A2}$) to MSC 104$_A$.

At step 226, the MRC establishes an audio session with the calling party device. In one embodiment, the audio session is operable for providing audio content to the calling party device. In one embodiment, the audio session is established using a circuit-switched connection. In one embodiment, the audio session is established between the calling party device and the MRC. In another embodiment, the audio session is established between the calling party device and an audio server associated with an MRC (e.g., an audio server hosted within CSN 110). In continuation of the above example, assuming that the called party associated with WUD 106$_{B1}$ configured the multimedia ringback service such that audio content is provided to the calling party associated with WUD 106$_{A2}$ and that the audio content destined for WUD 106$_{A2}$ is stored on MRC 120, the MRC 120 establishes an audio session with WUD 106$_{A2}$ via CSN 110.

In one embodiment, following establishment of the audio session, audio content is provided to the calling party device using the audio session. In one embodiment, audio content comprises at least one of: an enhanced ringback tone, an announcement, at least a portion of a song, and like audio content. In one embodiment, audio content provided to the calling party device is stored on at least one of: a remote content server, an audio server associated with the MRC, a video server associated with the MRC, and like servers operable for storing audio content and providing the audio content to remote terminals.

At step 228, the MRC transmits at least one multimedia content identifier to the calling party device. In one embodiment, the at least one multimedia content identifier is identified by the MRC using at least a portion of the subscriber service information (e.g., subscriber service information provided to the MRC as a portion of the calling party device address request message received from the O-MSC). In another embodiment, the at least one multimedia content identifier is identified by the MRC by querying at least one database using called party information and calling party information (e.g., a mapping from the called party to the calling party comprising associated multimedia content identifiers).

In one embodiment, the at least one multimedia content identifier comprises at least one of: at least one non-video content identifier and at least one video content identifier. In one embodiment, a multimedia content identifier comprises at least one Uniform Resource Identifier (URI) such as a Uniform Resource Locator (URL), a Uniform Resource Name (URN), and the like. In one embodiment, the at least one multimedia content identifier is operable for retrieving multimedia content for display via at least one user interface associated with the calling party device. In another embodiment, the at least one multimedia content identifier is operable for establishing at least one multimedia session, where the at least one multimedia session is operable for providing multimedia content to the calling party device.

In one embodiment, the at least one multimedia session comprises at least one of: at least one data session and at least one video session. In one such embodiment, the data session is operable for providing non-video content to the calling party device, where the non-video content comprises at least one of: text content, still-image content, and like non-video content. For example, in one embodiment, a data session comprises a Hyper-Text Transfer Protocol (HTTP) session. In another such embodiment, the video session is operable for proving video content (e.g., animated-image content, video content, and the like) to the calling party device. For example, in one embodiment, a video session comprises a Real Time Streaming Protocol (RTSP) session.

In one embodiment, the at least one multimedia content identifier is communicated from the MRC to the calling party device using at least one multimedia content identification message. For example, in one embodiment, the at least one multimedia content identifier is communicated to the calling party device using at least one Session Initiation Protocol (SIP) REFER message. In continuation of the above example, MRC 120 transmits two multimedia content URIs to WUD 106$_{A2}$. In this example, the first multimedia content URI identifies a still image and the second multimedia content URI identifies a video clip.

At step 230, the calling party device requests multimedia content using the at least one multimedia content identifier. In one embodiment, the multimedia content is requested by the calling party device from at least one remote system, where the at least one remote system comprises at least one of: a MRC, an audio server, a text server, an image server, a video server, and like systems operable for storing multimedia content and providing multimedia content to a calling party device.

In one embodiment, the calling party device requests non-video content by transmitting at least one non-video URI towards at least one remote system. In one such embodiment, for example, non-video content (such as text content, image content, and the like) is requested using HTTP. In another embodiment, the calling party device requests video content by transmitting at least one video URI towards at least one remote system. In one such embodiment, for example, video content is requested using RTSP. In continuation of the above example, WUD $106_{A2}$ requests multimedia content using the two multimedia content URIs provided by MRC 120.

At step 232, at least one remote system receives the multimedia content request comprising the at least one multimedia content identifier. The remote system receiving the multimedia content request depends upon the multimedia content identifier. In one embodiment, the remote system responds to the multimedia content request by establishing at least one multimedia session with the calling party device. As described above, the at least one remote system comprises at least of: a MRC, an audio server, a text server, an image server, a video server, and like systems operable for storing multimedia content and providing multimedia content to the calling party device. In continuation of the above example, assuming that the two multimedia content URIs identify MRC 120 as the source of the multimedia content, MRC 120 receives the requests for the multimedia content from WUD $106_{A2}$.

At step 234, a determination is made as to whether a non-video content identifier is received. In one embodiment, in which at least a portion of the non-video content requested by the calling party device is stored on a MRC (as indicated by the associated content identifier), the determination as to whether a non-video content identifier is received is performed by the MRC. In another embodiment, in which at least a portion of the non-video content requested by the calling party device is not stored on a MRC (i.e., content identifier indicates that the content is stored on at least one other system), the determination as to whether a non-video content identifier is received is performed by the at least one other system. If a non-video content identifier is not received, method 200 proceeds to step 238. If a non-video content identifier is received, method 200 proceeds to step 236.

At step 236, at least one remote system provides non-video content to the calling party device using at least one data session. As described herein, the at least one remote system comprises at least one of a MRC, an audio server, a text server, an image server, and like non-video content servers. In continuation of the above example, MRC 120 transmits the still-image to WUD $106_{A2}$. Upon receiving the still-image from MRC 120 via the data session, WUD $106_{A2}$ adapts the still-image for display to at least one interface associated with WUD $106_{A2}$. In one embodiment, the at least one data session comprises a HTTP session. The method 200 then proceeds to step 238.

At step 238, a determination is made as to whether a video content identifier is received. In one embodiment, in which at least a portion of the video content requested by the calling party device is stored on a MRC (as indicated by the associated content identifier), the determination as to whether a video content identifier is received is performed by the MRC. In another embodiment, in which at least a portion of the video content requested by the calling party device is not stored on a MRC (i.e., content identifier indicates that the content is stored on at least one other system), the determination as to whether a video content identifier is received is performed by the at least one other system (e.g., VS 138 depicted in FIG. 1)). If a video content identifier is not received, method 200 proceeds to step 250, at which point connection establishment processing/signaling continues. If a video content identifier is received, method 200 proceeds to step 240.

At step 240, at least one video session is established between the at least one remote system and the calling party device. In one embodiment, a video session comprises a packet transfer session. In another embodiment, a video session comprises a streaming video session. In one further embodiment, a video session comprises a RTSP session. In continuation of the above example, a RTSP streaming video session is established between MRC 120 and WUD $106_{A2}$ (more specifically, between VS 124 associated with MRC 120 and WUD $106_{A2}$).

In one embodiment, in which the requested video content is stored on a MRC, the at least one remote system comprises the MRC. For example, as depicted in FIG. 1, a remote system for providing video content comprises VS 124 associated with MRC 120. In another embodiment, in which the requested video content is stored on a remote video server, the at least one remote system comprises the remote video server. For example, as depicted in FIG. 1, a remote system for providing video content comprises the VS 138 associated with IPN 130.

In one embodiment, in which the requested video content is stored on a MRC, the MRC establishes a video session with the calling party device. For example, in one such embodiment a custom client stored on the calling party device requests video content from the MRC using the RTSP control protocol. In this example, prior to establishing a (Real-Time Transport Protocol) RTP bearer stream, the calling party device and the MRC exchange port numbers, streaming parameters, and like information for establishing a streaming video session. In one such embodiment, the information is exchanged using RTSP DESCRIBE messages and RTSP SETUP messages. The RTSP messages are processed by the RTSP server-side stack of the MRC in order to establish the video session between the calling party device and the MRC.

In another embodiment, in which the requested video content is not stored on a MRC, the MRC establishes a video session with the calling party device as described herein with respect to the embodiment in which the video content is stored on the MRC. Furthermore, the MRC then establishes a video session with the remote system on which the video content is stored. For example, in one such embodiment, the RTSP client-side stack of the MRC requests the video content from the remote system using RTSP DESCRIBE messages and RTSP SETUP messages. In this embodiment, the MRC requests delivery of the RTP stream (i.e., the streaming video content) to the calling party device (specified using the calling party device IP address).

In other words, in this embodiment in which the video content is not stored on the MRC, the MRC bridges the video session established between the calling party device and the MRC server-side stack with the video session established between the MRC client-side stack and the remote system storing the video content. As such, the video session is established in a manner enabling the MRC to maintain control of the video session irrespective of the source of the video content provided to the calling party device. In one embodiment, by maintaining control of the established video session, the MRC is able to,provide enhanced multimedia ringback service functionality (e.g., switching between multimedia content sessions depending on presence of audio content, providing multimedia content after detection of a response to the connection establishment request, and the like).

In one embodiment, steps 234 and 236 (i.e., establishing at least one non-video session for providing non-video content to a calling party device) may be performed contemporaneously with steps 238 and 240 (i.e., establishing at least one video session for providing video content to a calling party device). In other words, since establishment of a video session typically requires more time than establishment of a data session, a calling party device is provided with various non-video content (and, optionally, enhanced audio content via the audio session) during completion of video session establishment. As such, upon completion of video session establishment, at least a portion of the non-video content displayed on the calling party device is replaced with the video content provided via the established video session.

At step 242, the MRC maps the audio session to the video session. In one embodiment, the mapping between the audio session (running over the circuit bearer) and the video session (running over the packet bearer) comprises mapping information. In one embodiment, the mapping information is maintained by the MRC for the duration of the video session. In one embodiment, the mapping information comprises audio session information and video session information. For example, video session information maintained by the MRC as mapping information comprises video session start time information, video session port number information, video content characteristic information (e.g., whether the video content comprises an audio portion), and like information.

At step 244, a determination is made as to whether the video content requested by the calling party device comprises an audio portion. In one embodiment, the determination as to whether the video content comprises an audio portion is performed using at least a portion of the mapping information maintained by the MRC. If the video content does comprise an audio portion, method 200 proceeds to step 246, at which point the MRC pauses the audio content provided to the calling party device via the audio session. If the video content does not comprise an audio portion, method 200 proceeds to step 248.

At step 246, upon detection by the MRC that the requested video content comprises an audio portion, the MRC suppresses (e.g., pauses, stops, and the like) the audio content provided via the audio session. By suppressing the audio content provided via the audio session, the MRC enables the calling party to experience the audio content provided as a portion of the video content. In one embodiment, following suppression of the audio content, the audio session is terminated by the MRC. The method 200 then proceeds to step 248.

At step 248, the at least one remote system provides video content to the calling party device using the established video session. As described herein, the at least one remote system comprises at least one of a MRC, a video server, and like content servers. In continuation of the above example, MRC 120 streams the video content (i.e., the video clip identified using the video URI) to WUD $106_{A2}$. The WUD $106_{A2}$ receives the streaming video content from MRC 120 and adapts the streaming video for display to at least one interface associated with WUD $106_{A2}$. In one embodiment, the at least one video session comprises a RTP session. In another embodiment, the at least one video session comprises a RTSP session. In one embodiment, video content is provided to the calling party device in response to a RTSP PLAY message initiated by the calling party device.

In the embodiment in which the requested video content is stored on the MRC, the MRC begins streaming the requested video content to the calling party device in response to the RTSP PLAY message. In the embodiment in which the requested video content is not stored on the MRC, upon receiving the RTSP PLAY message from the calling party device, the client-side stack of the MRC initiates a corresponding RTSP PLAY message to the remote system on which the video content is stored. Upon receiving the RTSP PLAY message from the client-side stack of the MRC, the remote system begins streaming the requested video content to the calling party device via the MRC. In one embodiment, in which the video content is streamed to the calling party device using a RTP session, the RTP session does not traverse the RTSP stack on the MRC.

At step 250, a determination is made as to whether a response to the connection establishment request is detected. In one embodiment, a response to the connection establishment request comprises at least one of: a called party answering the phone, detecting that the connection establishment request has been transferred to a call answering service (e.g., a voicemail server), and like responses. If a response is not detected, method 200 returns to step 248 (i.e., the calling party device continues to receive multimedia content). In other words, multimedia content is continuously provided to the calling party device until a response to the connection establishment request is detected. If a response is detected, method 200 proceeds to step 252.

At step 252, the T-MSC notifies the O-MSC of the detection of a response to the connection establishment request. In one embodiment, notification of the O-MSC of the detection of the response to the connection establishment request is performed using an Answer Message (ANM). In continuation of the above example, MSC $104_B$ notifies MSC $104_A$ of the detection of the response to the connection establishment request.

At step 254, the call leg associated with the calling party and the call leg associated with the called party are bridged. In one embodiment, in which audio content is still being provided to the calling party device using the audio session, an audio session release message is transmitted to the MRC for releasing the audio session. As described herein, in another embodiment, in which the video content comprises an audio portion, the audio session is released by the MRC contemporaneous with initiation of the transmission of video content to the calling party device.

In one embodiment, the O-MSC transmits an Integrated Services User Part Release (ISUP REL) message to the MRC for releasing the audio session with the calling party device. Upon receiving the ISUP REL message, the MRC releases the audio session (e.g., releases the circuit-switched trunk established for providing the audio content to the calling party device). In this embodiment, the MRC transmits an ISUP Release Complete (RLC) message to the O-MSC for notifying the O-MSC that the audio session has been successfully released.

At step 256, a determination is made as to whether multimedia content termination is delayed. In one embodiment, multimedia content termination is delayed using at least one delay parameter (e.g., a RTSP RANGE parameter). In one embodiment, the multimedia content is configured to continue for a specific length of time measured from at least one of: the initiation of the connection establishment request, the establishment of the audio session, the establishment of the data session, the establishment of the video session, the detection of a response to the connection establishment request, and the like. If multimedia content termination is not delayed, the method 200 proceeds to step 260. If multimedia content termination is delayed, the method 200 proceeds to step 258.

At step 258, the at least one remote system continues providing at least a portion of the multimedia content to the called party device for the duration of a multimedia content termination delay period. In one embodiment, the multimedia content termination delay period essentially operates as a timer by which the MRC determines a length of time for which the multimedia content continues to be provided to the calling party device after a response to the connection establishment request is detected. In one embodiment, the multimedia content termination delay period is configurable by the called party. In one embodiment, multimedia content termination delay period is determined by the MRC. The method 200 then proceeds to step 260.

At step 260, transmission of the multimedia content is terminated. In one embodiment, the least one multimedia session over which the multimedia content is provided is released. In the embodiment in which video content is provided to the calling party device from the MRC, the MRC releases the video session. In the embodiment in which video content is provided to the calling party device from a remote video server, the RTSP client-side stack on the MRC signals the video server to terminate transmission of video content and to release the video session using a RTSP PAUSE message and a RTSP TEARDOWN message, respectively. At step 262, voice communication between the calling party and the called party begins. The voice communication is supported using the connection established between the calling party device and the called party device. The method 200 then proceeds to step 264, where the method 200 ends.

Although described herein as terminating prior to the beginning of voice communications, in one embodiment, at least a portion of the multimedia content may continue to be provided to the calling party after the voice communications between the calling party and the called party have begun. For example, an image may continue to be displayed on at least one interface associated the calling party device after the beginning of voice communications. Similarly, a variety of other multimedia content may continue to be provided to the calling party after beginning of voice communications. In one embodiment, at least a portion of the multimedia content provided to the calling party device is manually controlled (e.g., paused, stopped, resumed, and the like) by the calling party by actuating at least one user entry means (e.g., button, touch-screen, voice activation, and the like) on the calling party device.

Although depicted as being performed serially, those skilled in the art will appreciate that processing associated with establishment of the at least one multimedia session may be performed contemporaneously with processing associated with establishment of the audio session. In other words, in at least one embodiment, step 226 may be performed contemporaneously with at least a portion of steps 228 through 240. As such, in one embodiment, audio content is provided to the calling party device during multimedia session establishment for providing multimedia content to the calling party device. Similarly, in another embodiment, non-video content is provided to the calling party device during video session establishment. Furthermore, although described herein with respect to a calling party device requesting multimedia content using multimedia content identifiers, in one embodiment, at least a portion of the multimedia content is pushed to the calling party device by the at least one remote system storing the video content (e.g., by an MRC).

It is contemplated that at least a portion of the described functions may be combined into fewer functional elements/devices. Similarly, it is contemplated that various functions may be performed by other functional elements, or that the various functions may be distributed across the various functional elements in a different manner. For example, at least a portion of the functions performed by MRC 120 may be performed by the MSCs 104. Furthermore, although described herein with respect to one MRC, at least a portion of the described functions may be distributed across a plurality of MRCs.

Figure 3:
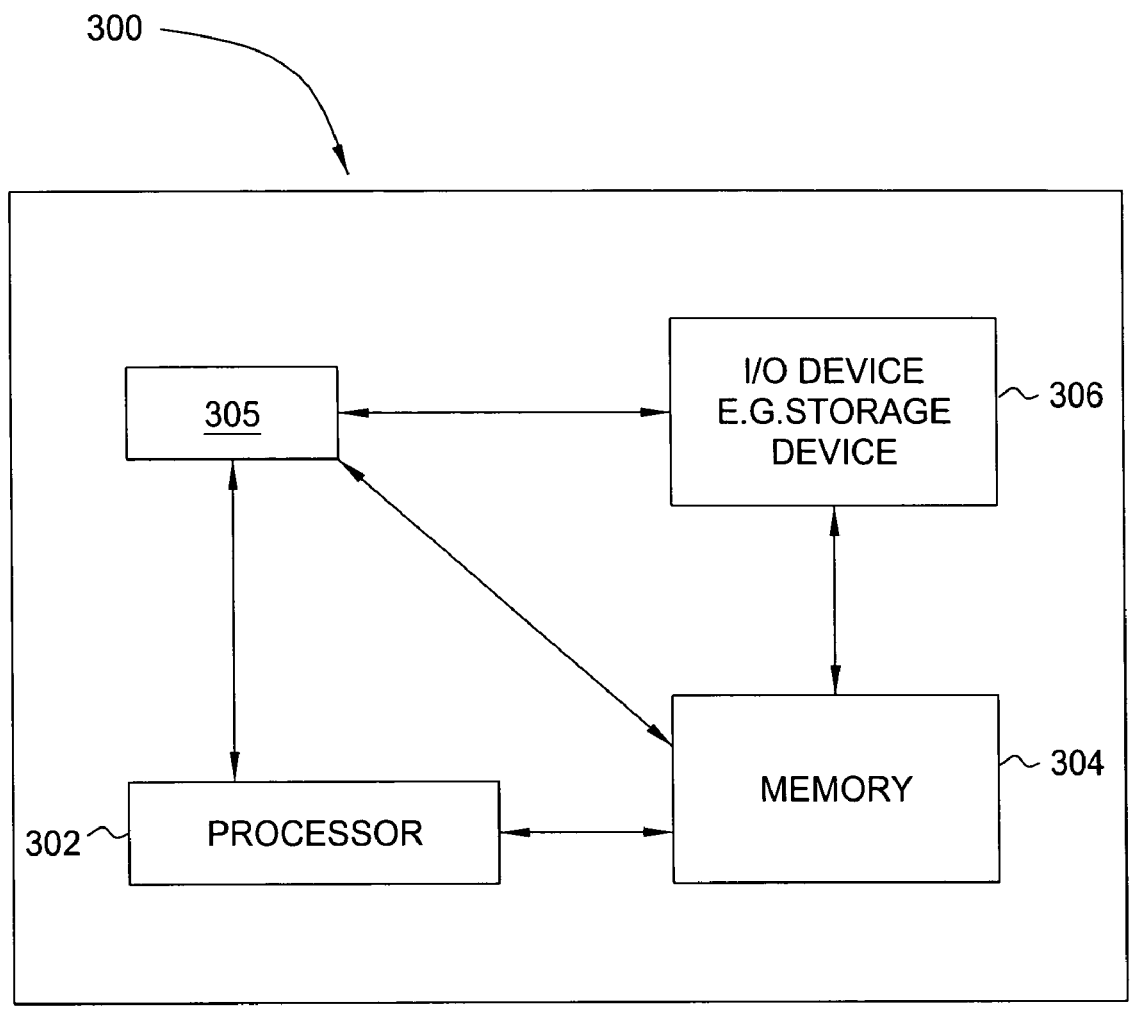
FIG. 3 depicts a high level block diagram of a general purpose computer suitable for use in performing the functions described herein.

FIG. 3 depicts a high level block diagram of a general purpose computer suitable for use in performing the functions described herein. As depicted in FIG. 3, system 300 comprises a processor element 302 (e.g., a CPU), a memory 304, e.g., random access memory (RAM) and/or read only memory (ROM), a multimedia ringback controller module 305, and various input/output devices 306 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present multimedia ringback controller module or process 305 can be loaded into memory 304 and executed by processor 302 to implement the functions as discussed above. As such, the present multimedia ringback controller process 305 (including associated data structures) of the present invention can be stored on a computer readable medium or carrier, e.g., RAM memory, magnetic or optical drive or diskette and the like.

Although various embodiments which incorporate the teachings of the present invention have been shown and described in detail herein, those skilled in the art can readily devise many other varied embodiments that still incorporate these teachings.

What is claimed is:

1. A method for providing content toward a calling party device via a network, comprising:
   receiving a multimedia ringback service request associated with a connection request for establishing a connection between said calling party device and a called party device;
   determining an address associated with said calling party device;
   identifying content to be provided toward said calling party device, said content comprising non-video content and video content, said content having associated therewith respective first and second content identifiers; and
   transmitting said first and second content identifiers toward said calling party device using said address, said first content identifier for use by said calling party device to automatically request said non-video content from said network, said second content identifier for use by said calling party device to automatically request said video content from said network;
   wherein said content is propagated toward said calling party device contemporaneously with establishment of said connection between said calling party device and said called party device.

2. The method of claim 1, wherein said determining comprises:
   transmitting at least one address request toward at least one remote system; and
   receiving said address in response to said at least one address request.

3. The method of claim 2, wherein said at least one remote system comprises at least one of: at least one Authentication, Authorization, and Accounting (AAA) server and said calling party device.

4. The method of claim 1, further comprising:
receiving, from said calling party device, a content request including said respective content identifier; and
propagating, toward said calling party device, said content associated with said respective content identifier.

5. The method of claim 1, wherein said non-video content comprises at least one of text content, still-image content, animated-image content.

6. The method of claim 1, further comprising:
establishing an audio session with said calling party device for providing audio content to said calling party device contemporaneously with establishment of said connection between said calling party device and said called party device.

7. The method of claim 6, wherein said video content is propagated toward said calling party device using a video session, further comprising:
establishing a mapping between said audio session and said video session.

8. The method of claim 7, further comprising:
suppressing said audio content using said mapping in response to a determination that said video content comprises an audio portion.

9. The method of claim 4, further comprising:
initiating termination of propagation of said video content toward said calling party device in response to detecting a response to said connection request.

10. The method of claim 4, wherein further comprising:
maintaining propagation of said video content toward said calling party device in response to detecting a response to said connection request.

11. The method of claim 4, further comprising:
delaying termination of propagation of said video content toward said calling party device in response to a determination that said video content being propagated to said calling party device comprises no audio content.

12. The method of claim 1, wherein said content is adaptable for presentation via at least one interface associated with said calling party device.

13. A computer non-transitory readable storage medium storing a software program, that, when executed by a computer, causes the computer to perform a method for providing content toward a calling party device via a network, the method comprising:
receiving a multimedia ringback service request associated with a connection request for establishing a connection between the calling party device and a called party device;
determining an address associated with said calling party device;
identifying content to be provided toward said calling party device, said content comprising non-video content and video content, said content having associated therewith respective first and second content identifiers; and
transmitting said first and second content identifiers toward said calling party device using said address, said first content identifier for use by said calling party device to automatically request said non-video content from said network, said second content identifier for use by said calling party device to automatically request said video content from said network; and
wherein said content is propagated toward said calling party device contemporaneously with establishment of said connection between said calling party device and said called party device.

14. An apparatus for providing content toward a calling party device via a network, comprising:
means for receiving a multimedia ringback service request associated with a connection request for establishing a connection between said calling party device and a called party device;
means for determining an address associated with said calling party device;
means for identifying content to be provided toward said calling party device, said content comprising non-video content and video content, said content having associated therewith respective first and second content identifiers; and
means for transmitting said first and second content identifiers toward said calling party device using said address, said first content identifier for use by said calling party device to automatically request said non-video content from said network, said second content identifier for use by said calling party device to automatically request said video content from said network;
wherein said content is propagated toward said calling party device contemporaneously with establishment of said connection between said calling party device and said called party device.

15. The method of claim 1, further comprising:
receiving, from said calling party device, a content request including said content respective identifier; and
propagating, toward said calling party device, at least one parameter adapted for use by the calling party device in establishing a video session for use in propagating said video content toward said calling party device.

16. The method of claim 15, wherein the at least one parameter comprises at least one of: at least one port number and at least one streaming parameter.

17. The method of claim 15, wherein the at least one parameter is propagated using the Real Time Streaming Protocol (RTSP).

18. The method of claim 1, further comprising:
propagating, toward a content server storing said video content, at least one parameter adapted for use by the content server in establishing the video session for propagating said video content toward said calling party device.

19. The method of claim 18, further comprising:
propagating, toward the content server storing said video content, a request for said video content to be provided to said calling party device.

20. The method of claim 1, wherein said respective second content identifier is a Uniform Resource Identifier (URI).

21. A method for receiving ringback at a calling party device via a network, comprising:
receiving a multimedia ringback service request associated with a connection request for establishing a connection between said calling party device and a called party device;
determining an address associated with said calling party device;
identifying content to be provided toward said calling party device, said content comprising non-video content and video content, said content having associated therewith respective first and second content identifiers; and
transmitting a first content identifier and a second content identifier toward said calling party device using said address, said first content identifier associated with said non-video content and said second content identifier associated with said video content, said first content identifier for use by said calling party device to automatically request said non-video content from said network, said second content identifier for use by said calling party device to automatically request said video content from said network;

wherein said content is propagated toward said calling party device contemporaneously with establishment of said connection between said calling party device and said called party device.

\* \* \* \* \*